United States Patent
Lindsay

[11] 3,757,397
[45] Sept. 11, 1973

[54] CUTTING TOOLS
[76] Inventor: Harold W. Lindsay, 2480 N.W. Vaugh, Portland, Oreg. 97240
[22] Filed: Nov. 5, 1971
[21] Appl. No.: 196,117

Related U.S. Application Data
[63] Continuation-in-part of Ser. No. 885,199, Dec. 15, 1969, abandoned.

[52] U.S. Cl............................................. 29/105 A
[51] Int. Cl.............................................. B26d 1/12
[58] Field of Search.......................... 29/105, 105 A

[56] References Cited
UNITED STATES PATENTS

| | | | |
|---|---|---|---|
| 3,200,474 | 8/1965 | Kralowetz ....................... | 29/105 R |
| 3,138,847 | 6/1964 | Berry, Jr. .......................... | 29/105 R |
| 3,104,453 | 9/1963 | Greenleaf ......................... | 29/105 A |
| 3,332,130 | 7/1967 | Armstrong ........................ | 29/105 R |
| 3,229,350 | 1/1966 | Yogus................................ | 29/105 A |

Primary Examiner—Harrison L. Hinson
Attorney—Stephen W. Blore, Arthur L. Whinston et al.

[57] ABSTRACT

A cutting tool for use with replaceable carbide cutting inserts includes a head in which a recess is formed with a generally longitudinally extending portion disposed inwardly from the work-facing surface of the tool and a generally transversely extending portion disposed perpendicularly to the first named portion. A nest is removably disposed within the recess and includes a seat formed in one of its longitudinally extending surfaces. The nest further comprises a keying lug extending generally transversely from either one edge of or the central portion of the other of its longitudinally extending surfaces, which lug is received in the generally transversely extending portion of the recess. A replaceable carbide cutting insert is disposed within the seat such that at least one cutting edge extends outwardly of the cutter body. The seat serves accurately to locate the insert with respect to the nest and to hold the same therein. The lug serves accurately to locate the nest within the recess and to lock the nest to the cutter body.

1 Claim, 9 Drawing Figures

PATENTED SEP 11 1973 3,757,397
SHEET 1 OF 2
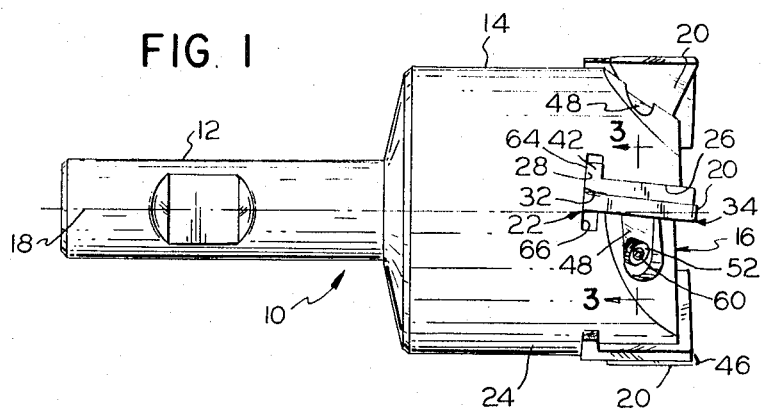
FIG. 1
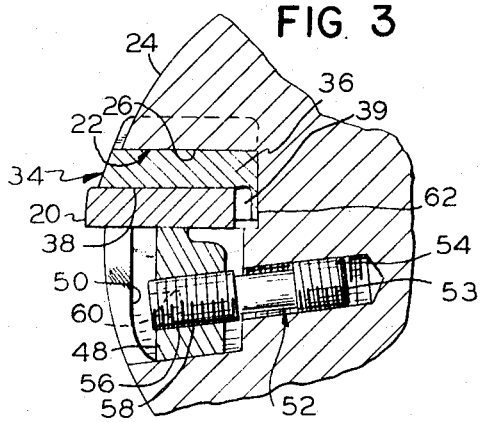
FIG. 3
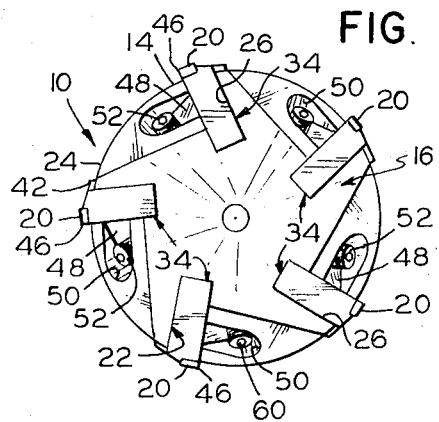
FIG. 2
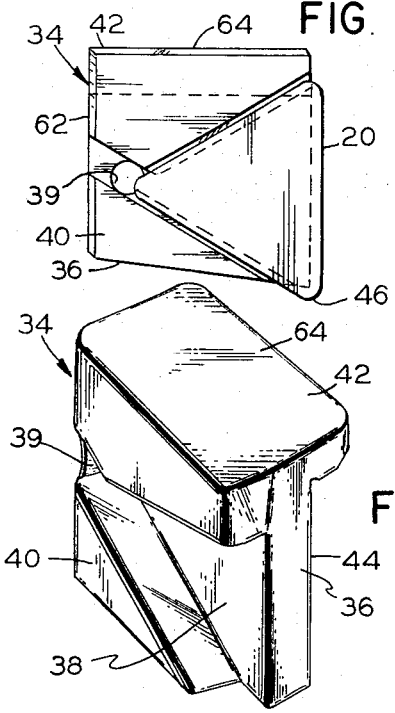
FIG. 4
FIG. 5
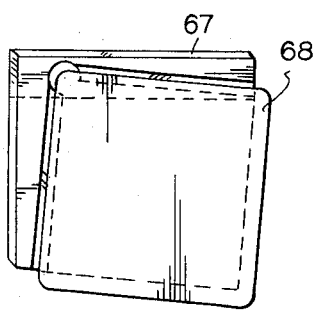
FIG. 6
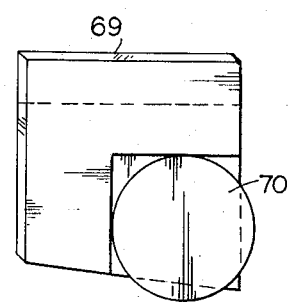
FIG. 7
HAROLD W. LINDSAY
INVENTOR
BY
BUCKHORN, BLORE, KLARQUIST & SPARKMAN
ATTORNEYS

PATENTED SEP 11 1973

HAROLD W. LINDSAY
INVENTOR

BY
BUCKHORN, BLORE, KLARQUIST & SPARKMAN
ATTORNEYS

CUTTING TOOLS

This is a continuation-in-part of my copending application Ser. No. 885,199 filed Dec. 15, 1969, for CUTTING TOOL, now abandoned.

This invention relates to cutting tools in which a cutting tool holder releasably holds a replaceable cutting insert composed of an extremely hard cutting material, such as a carbide cutter, which is discarded and replaced when it becomes dull.

The use of such replaceable cutting inserts in cutting tools is expanding due to their economy and efficiency. Accurate and quick positioning of the inserts with respect to the cutter body, however, has continued to pose a problem.

The principal object of the present invention is to provide cutting tools that will serve accurately and quickly to position replaceable carbide cutting inserts in cutter bodies.

A further object of the present invention is to provide cutting tools that will make it possible economically and efficiently to provide production tooling for use on relatively small scale jobs.

In general, the objects of my invention are achieved by providing a cutting tool comprising a cutter body having a head with a work-facing surface disposed generally perpendicularly to the longitudinal axis of the tool. At least one recess is formed in such head with a generally longitudinally extending portion disposed inwardly thereof from the work-facing surface and a generally transversely extending portion disposed perpendicularly to the generally longitudinally extending portion.

A nest is removably disposed within the recess and comprises a seat formed in one of its longitudinally extending surfaces and a keying lug extending generally transversely from the other of its longitudinally extending surfaces, such lug being adapted to be received in a keying slot formed by the generally transversely extending portion of the recess.

A replaceable carbide cutting insert is disposed within the seat with its cutting edge extending outwardly of the work-facing surface and means such as a wedge are provided to exert pressure against the insert transversely thereof to retain the same in the seat.

The seat in the nest serves accurately to locate the insert with respect to the nest and to hold such insert within the nest. The keying lug and slot serve accurately to locate the nest within the recess in the head and to lock the nest thereto. The combination of the seat and the lug serves precisely and accurately to position the insert in all directions with respect to the work-facing surface of the tool.

Replacement of an insert is accomplished simply by releasing the pressure applied to it by the wedge and removing the insert from its seat in the nest. The nest may then also be easily replaced merely by withdrawing it from the recess.

Nests constructed in accordance with the present invention may efficiently be utilized in connection with carbide inserts of rectangular, triangular or other well known shapes, and such nests can be used accurately to locate cutting inserts in milling cutters, flat cutters or other special tooling. The invention makes it possible to construct production tooling economically and efficiently, which is especially desirable in the case of tooling to be used for small scale jobs.

The invention will be more clearly understood from the following description when taken in conjunction with the accompanying drawings in which:

FIG. 1 is a side elevational view of one embodiment of a cutting tool according to the present invention.

FIG. 2 is an end view showing the work-facing surface of the cutting tool of FIG. 1.

FIG. 3 is a sectional view to an enlarged scale taken on line 3—3 of FIG. 1.

FIG. 4 is a perspective view of a nest and triangular cutting insert suitable for use withh the present invention.

FIG. 5 is a perspective view to an enlarged scale of the nest of FIG. 4.

FIG. 6 is a perspective view similar to FIG. 4 illustrating a nest and a rectangular cutting insert.

FIG. 7 is a perspective view similar to FIGS. 4 and 6 illustrating a nest and a round cutting insert.

Figure 8:
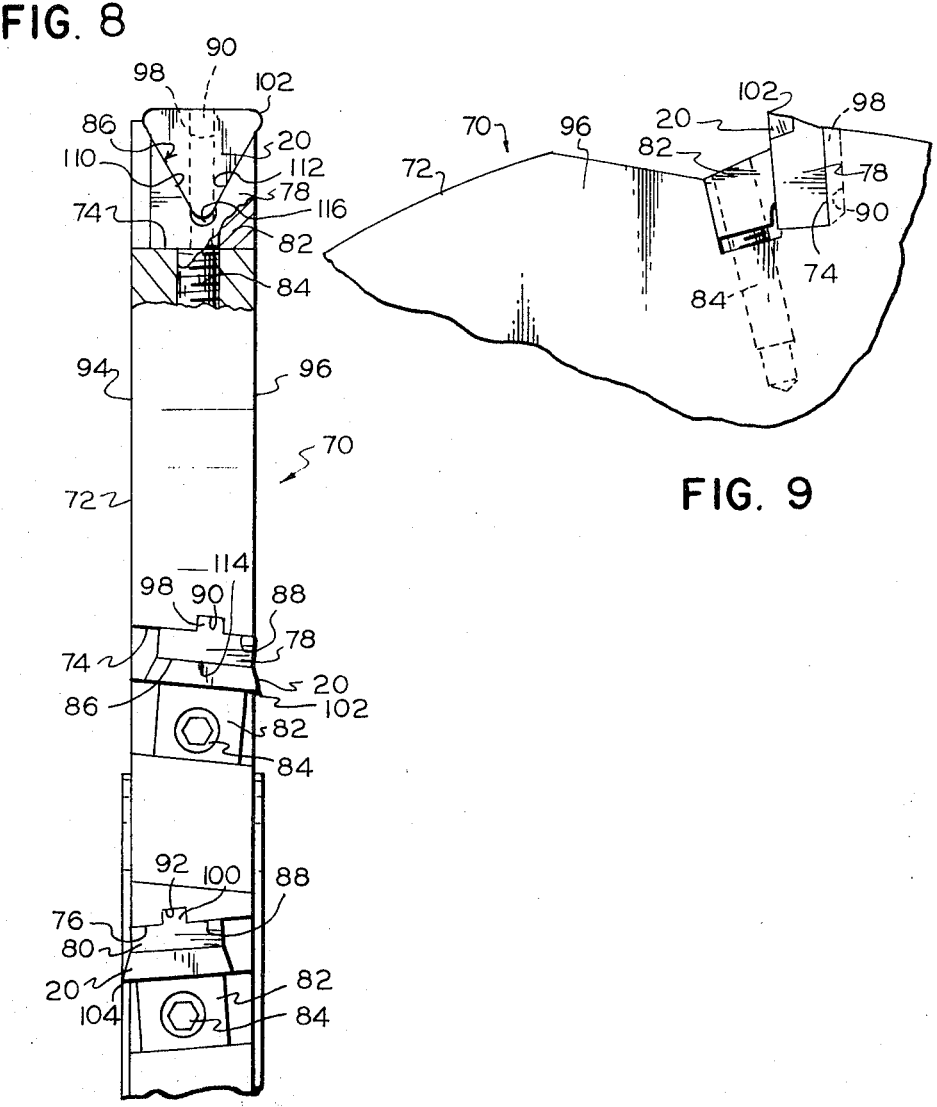
FIG. 8 is a fragmentary, partially sectional side elevation view of a cutting tool forming an alternate embodiment of the invention.

As can be seen from FIGS. 1 and 2, a cutting tool forming one embodiment of the present invention is illustrated in the form of a milling cutter 10 having a shank 12 terminating in a head 14 whose work-facing surface 16 is disposed generally perpendicularly to the longitudinal axis 18 of the tool. The cutter 10 is illustrated as being rotatable about its longitudinal axis 18 although it will be understood that cutting tools according to the present invention need not always be rotatable.

The cutter 10 herein illustrated is designed to accommodate five replaceable carbide cutting inserts 20. As such, the head 14 is provided with recesses 22 therein which extend inwardly from the work-facing surface 16 and from the outer peripheral surface 24 as shown. Each such recess 22 consists of a generally longitudinally extending portion 26 which lies generally parallel to the longitudinal axis 18 of the tool and a generally transversely extending portion 28 perpendicular to the portion 26. As illustrated, the transversely extending portion 28 is positioned at the inner extremity 32 of the portion 26 although it could be located at other points therealong. For example, the portion 28 may be disposed perpendicularly to the portion 26 centrally thereof instead of at its inner extremity 32.

A nest 34 is removably disposed within each of the recesses 22. Each such nest 34 comprises a generally longitudinally extending portion 36 which is disposed generally parallel to the longitudinal axis 18 of the tool. A seat 38 having a relief 39 is formed in the portion 36 inwardly of the longitudinally extending surface 40. Seat 38 is designed to hold one of the cutting inserts 20 and to locate such insert accurately with respect to the nest 34.

A lug 42 extends perpendicularly from the longitudinally extending portion 36 of each of the nests 34. The lug 42 extends in the transverse direction of the tool from the opposite longitudinally extending surface 44 of the portion 36. As can be seen from the drawings, the longitudinally extending portion 36 of the nest 34 is received within the longitudinally extending portion 26 of the recess 22, and the lug 42 is received within the transversely extending portion 28 thereof. The seat 38 thus serves accurately to locate the insert 20 with respect to the nest 34 and to hold the same therein, while the lug 42 serves accurately to locate the nest 34 within the recess 22 and to lock the nest 34 to the cutter. The combination of the seat 38 and the lug 42 serves precisely and accurately to position the insert 20 so that its cutting edge 46 may be precisely located with respect to the work-facing surface 16 of the tool.

A wedge 48 is positioned in a recess 50 in the head 14 adjacent each nest 34, being retained within the head by a screw 52. As can be seen in FIG. 3, the screw 52 is provided with a right hand thread 53 at its inner extremity 54 and with a left-hand thread 56 at its outer extremity 58. The inner extremity 54 is threadedly received within the head 14 while the outer extremity 58 is threadedly received within the wedge 48. The screw 52 is also provided with an internal wrenching socket 60 in its outer extremity 58 whereby rotation of the screw in the clockwise direction simultaneously engages the thread 53 into the head 14 and draws the wedge 48 into engagement with the insert 20, thereby to exert transverse pressure thereagainst to retain the insert in the seat 38.

If desired, the inner surfaces 62 and 64 of the nest 34 may be provided with a machined finish precisely to locate the nest with respect to the work-facing surface 16. The action of the lug 42 thus is seen not only to lock the nest 34 to the head 14, but also to locate the nest precisely with respect to the surface 16 without the necessity of providing any adjusting screw.

FIG. 6 discloses a nest 67 in accordance with the present invention designed to accommodate a rectangular cutting insert 68. FIG. 7 discloses a nest 69 according to the present invention designed to accommodate a round cutting insert 70. Obviously the cutter tool of the present invention may be adapted to retain such other forms of inserts merely by removing the nests 34 holding the triangular inserts 20 and replacing the same either with nests 67 as shown in FIG. 6 or with nests 69 as shown in FIG. 7.

Replacement of an insert is accomplished merely by rotating the screw 52 in a counterclockwise direction. Such releases the transverse pressure against the insert and the nest permitting either or both to be removed and replaced.

Figure 9:
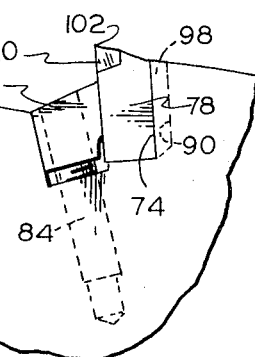
FIG. 9 is a fragmentary, side elevation view of the cutting tool of FIG. 8.

EMBODIMENT OF FIGS. 8 and 9

A cutting tool 70 forming an alternate embodiment of the invention comprises a slotting cutter and includes a disc-like body 72 having recesses 74 and 76 for receiving identical and symmetrical nests 78 and 80 holding carbide cutting inserts 20, the recesses and nests being disposed on alternate sides of body 72 to define an allochiral cutter arrangement. Wedges 82 are pressed by screws 84 against the inserts to press the inserts into seats 86 in the nests 78 and 80 and the nests against walls 88 of the recesses 74 and 76.

The body 72 has keying or splining slots 90 and 92 which extend generally parallel to parallel end faces 94 and 96 lying in planes perpendicular to the axis of rotation of the body. The nests 78 and 80 have centrally positioned keying or splining ribs 98 and 100 which fit closely and slidably in the slots 90 and 92, respectively. The slots are sufficiently longer than the splines that the inserts are seated on the bottoms of the recesses 74 and 76. These keying or splining structures precisely locate extreme cutting edge portions 102 and 104 of the cutters 20 known distances from the end faces 96 and 94 respectively.

The seats 86 are symmetrically disposed within the nests and are generally V-shaped having side walls 110 and 112 angled relative to one another, back walls 114 perpendicular to the side walls, and clearance portions 116 at the apices of the "V"'s formed by the sidewalls. The seats are, in effect, shallow grooves or notches of a depth less than the thickness of the inserts 20 so that the wedges press against the inserts to hold the inserts against the back walls or bottoms 114 of the seats and the nests against the walls 88 of the recesses 74.

A feature of this embodiment is that the nests 78 and 80, being symmetrical and identical, and having their keying lugs 98 and 100 centrally located, can be used on either side of the cutter body 72. It is thus not necessary to build nests of opposite hand configuration, the same nest being able to be used on either side of the cutter and in any position with respect thereto.

I claim:

1. A cutting tool comprising
   a rotatable cutter body having opposed parallel end faces disposed perpendicularly to the axis of rotation thereof;
   at least one pair of symmetrically disposed recesses formed in said body, one each of said recesses of said pair extending inwardly of each of said end faces of said body, each said recess of said pair having a first generally axially extending portion extending inwardly from its respective end face and a keyway disposed generally perpendicularly to said first portion, each said keyway being positioned interiorly of said cutter body;
   a unitary symmetrical nest removably disposed within each said recess, said nest comprising
   a first portion received in said first portion of said recess,
   a symmetrically disposed, V-shaped seat formed in one surface of said first portion of said nest, said seat having a bottom and two insert retaining surfaces angularly disposed with respect to each other, said insert retaining surfaces converging to a relief, said bottom and said insert retaining surfaces combining to form a symmetrically disposed support for independently positioning a replaceable cutting insert in said nest and accurately locating said insert with respect thereto, each of said insert retaining surfaces being disposed generally perpendicularly to said bottom of said seat, said bottom being disposed parallel to said one surface of said nest, and
   a symmetrically disposed keying lug extending perpendicularly to the other surface of said first portion of said nest, said lug being centrally positioned behind said seat, said lug being received in said keyway, said nests thereby being interchangeable as between each of said recesses of said pair, said lug and said keyway accurately locating each said nest within its recess and locking the same therein;
   a replaceable cutting insert disposed within and independently positioned in each said seat and having at least one cutting edge extending outwardly of its respective cutter end face, said insert being positioned within said seat against said bottom and said angularly disposed insert retaining surfaces, said insert being positioned radially with respect to said cutter body by the position of said insert retaining surfaces of said seat, said insert being positioned circumferentially of said cutter body by the position of said seat bottom; and
   means to exert pressure against said inserts transversly thereof to retain the same in said seats.

* * * * *